(12) United States Patent
Tan et al.

(10) Patent No.: US 10,848,339 B2
(45) Date of Patent: Nov. 24, 2020

(54) IMPLEMENTATION SYSTEM AND METHOD FOR INTERNET OF THINGS BASED ON ARTIFICIAL INTELLIGENCE

(71) Applicant: BEIJING BAIDU NETCOM SCIENCE AND TECHNOLOGY CO., LTD., Beijing (CN)

(72) Inventors: Dai Tan, Beijing (CN); Qian Xu, Beijing (CN); Jialin Li, Beijing (CN); Lei Gao, Beijing (CN); Zheng Li, Beijing (CN); Dachun Liao, Beijing (CN); Xiaolei Pan, Beijing (CN); Lun Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 74 days.

(21) Appl. No.: 16/306,434

(22) PCT Filed: Dec. 22, 2016

(86) PCT No.: PCT/CN2016/111572
§ 371 (c)(1),
(2) Date: Nov. 30, 2018

(87) PCT Pub. No.: WO2017/206493
PCT Pub. Date: Dec. 7, 2017

(65) Prior Publication Data
US 2019/0296934 A1 Sep. 26, 2019

(30) Foreign Application Priority Data

May 30, 2016 (CN) .......................... 2016 1 0371702

(51) Int. Cl.
*H04L 12/28* (2006.01)
*G05B 15/02* (2006.01)
(Continued)

(52) U.S. Cl.
CPC .......... *H04L 12/2834* (2013.01); *G05B 15/02* (2013.01); *G05B 19/418* (2013.01);
(Continued)

(58) Field of Classification Search
CPC . H04L 12/2834; H04L 12/2823; H04L 12/28; H04L 67/10; H04L 67/12;
(Continued)

(56) References Cited

U.S. PATENT DOCUMENTS 10,021,765 B1 * 7/2018 Elliot ...................... H04L 67/12
10,168,695 B2 * 1/2019 Barnickel .......... H04B 7/18506
(Continued)

FOREIGN PATENT DOCUMENTS

| CN | 102830687 A | 12/2012 |
|---|---|---|
| CN | 103092172 A | 5/2013 |

(Continued)

OTHER PUBLICATIONS

PCT/CN2016/111572 English translation of International Search Report dated Mar. 20, 2017, 3 pages.
(Continued)

*Primary Examiner* — Michael Won
(74) *Attorney, Agent, or Firm* — Lathrop GPM LLP

(57) ABSTRACT

Disclosed are an implementation system and method for Internet of Things (IoT) based on artificial intelligence (AI). The implementation system for Internet of Things based on artificial intelligence comprises: a cloud central control system, a home intelligent central control system and a home intelligent terminal. The home intelligent central control system provides, by means of a local module, information or service for a user; or, the home intelligent central control system cooperates with the cloud central control system, so as to provide information or service for the user; and the home intelligent terminal is used for responding to a control (Continued)

instruction sent by the home intelligent central control system, and/or sending state information about itself to the home intelligent central control system.

9 Claims, 2 Drawing Sheets

(51) Int. Cl.

| | |
|---|---|
| G10L 15/22 | (2006.01) |
| H04L 12/24 | (2006.01) |
| H04L 29/08 | (2006.01) |
| G05B 19/418 | (2006.01) |
| H04W 84/18 | (2009.01) |
| G06F 40/30 | (2020.01) |
| G06K 9/00 | (2006.01) |
| G10L 13/04 | (2013.01) |
| G10L 15/18 | (2013.01) |
| G10L 15/30 | (2013.01) |

(52) U.S. Cl.
CPC .............. *G06F 40/30* (2020.01); *G10L 15/22* (2013.01); *H04L 12/28* (2013.01); *H04L 41/16* (2013.01); *H04L 67/10* (2013.01); *H04L 67/12* (2013.01); *H04W 84/18* (2013.01); *G06K 9/00288* (2013.01); *G06K 9/00302* (2013.01); *G10L 13/043* (2013.01); *G10L 15/1815* (2013.01); *G10L 15/30* (2013.01); *G10L 2015/223* (2013.01); *Y02P 90/02* (2015.11)

(58) Field of Classification Search
CPC ........ H04L 41/16; G06F 40/30; H04W 84/18; G05B 15/02; G05B 2219/2642; G05B 19/418; G10L 15/22; G10L 15/26; G10L 15/30; G10L 15/1815; G10L 13/043; G10L 2015/223; Y02P 90/02; G06K 9/00302; G06K 9/00288; H04M 1/72533; G06N 20/00

See application file for complete search history.

(56) References Cited

U.S. PATENT DOCUMENTS

| | | | | |
|---|---|---|---|---|
| 10,298,604 B2* | 5/2019 | Epstein | ............... | H04L 63/0861 |
| 10,405,357 B2* | 9/2019 | Egner | ................... | H04W 4/029 |
| 10,606,226 B2* | 3/2020 | Chun | ................... | G05B 19/042 |
| 2015/0120015 A1 | 4/2015 | Fadell et al. | | |
| 2015/0198938 A1 | 7/2015 | Steele et al. | | |
| 2015/0319006 A1 | 11/2015 | Plummer et al. | | |
| 2015/0381417 A1* | 12/2015 | Renkis | ................ | H04L 41/0886 709/219 |
| 2016/0134932 A1* | 5/2016 | Karp | .................... | H04L 67/1097 348/155 |
| 2016/0139575 A1* | 5/2016 | Funes | ................. | H04L 12/2834 700/275 |
| 2016/0165387 A1* | 6/2016 | Nhu | ........................ | H04L 67/10 455/41.1 |
| 2016/0209899 A1* | 7/2016 | Brantner | ................ | H04L 12/12 |
| 2016/0255186 A1* | 9/2016 | Kaneblai Martins Costa | ............ | G06F 40/00 455/557 |
| 2016/0291553 A1* | 10/2016 | Hsu | ..................... | G05B 13/0265 |
| 2016/0308972 A1* | 10/2016 | Ding | ........................ | H04W 4/70 |
| 2016/0337441 A1* | 11/2016 | Bloomquist | ........... | G06Q 10/06 |
| 2016/0344569 A1* | 11/2016 | Chun | .................. | G06F 3/04842 |
| 2016/0381202 A1* | 12/2016 | Koo | .................. | H04M 1/72533 455/559 |
| 2017/0005515 A1* | 1/2017 | Sanders | .................... | H02J 3/381 |
| 2017/0041381 A1* | 2/2017 | Tal | ....................... | H04W 12/04 |
| 2017/0093915 A1* | 3/2017 | Ellis | ........................ | H04L 63/20 |
| 2017/0105046 A1* | 4/2017 | Shin | .................. | H04N 21/478 |
| 2017/0108236 A1* | 4/2017 | Guan | ..................... | H05B 47/19 |
| 2017/0223022 A1* | 8/2017 | Peterson | ............... | G06F 21/604 |
| 2017/0223807 A1* | 8/2017 | Recker | ...................... | H02J 7/34 |
| 2017/0251026 A1* | 8/2017 | Straub | .................. | H04L 65/102 |
| 2017/0264501 A1* | 9/2017 | Mathen | ................... | H04L 41/16 |
| 2017/0301218 A1* | 10/2017 | Tung | .................... | G08B 25/016 |
| 2017/0311159 A1* | 10/2017 | Tulliano | .................. | H04L 67/02 |
| 2017/0318923 A1* | 11/2017 | Gharabegian | ........... | E04H 15/28 |
| 2017/0329865 A1* | 11/2017 | Youn | .................... | H04L 67/10 |
| 2017/0364239 A1* | 12/2017 | Gould | ................. | G06F 3/04817 |

FOREIGN PATENT DOCUMENTS

| | | |
|---|---|---|
| CN | 103901867 A | 7/2014 |
| CN | 204613722 U | 9/2015 |
| CN | 105119946 A | 12/2015 |

OTHER PUBLICATIONS

Chinese Patent Application No. 201610371705.X, English translation of First Office Action dated Jul. 19, 2018, 8 pages.
Chinese Patent Application No. 201610371705.X, First Office Action dated Jul. 19, 2018, 10 pages.

* cited by examiner

IMPLEMENTATION SYSTEM AND METHOD FOR INTERNET OF THINGS BASED ON ARTIFICIAL INTELLIGENCE

CROSS REFERENCE TO RELATED APPLICATION

This application is a national phase application of International Application No. PCT/CN2016/111572, filed on Dec. 22, 2016, which claims priority to Chinese Patent Application Serial No. 201610371702.X, filed on May 30, 2016 by BEIJING BAIDU NETCOM SCIENCE AND TECHNOLOGY CO., LTD., entitled "Implementation System and Method for Internet of Things Based on Artificial Intelligence."

FIELD

The present invention relates to a field of Internet technology, in particular, to an implementation system and method for Internet of Things (IoT) based on artificial intelligence.

BACKGROUND

Artificial Intelligence (AI) is a new technical science that studies and develops theories, methods, techniques, and applications for simulating, extending, and extending human intelligence. Artificial Intelligence is a branch of computer science that attempts to understand the essence of intelligence and produce a new kind of intelligent machine that can make a response in a way similar to human intelligence. Research in this field includes intelligent ordering robots, language recognition, image recognition, natural language processing, expert systems and the like.

The Internet of Things (IoT) is an important part of the new generation of information technology, and an important stage of development in the era of "informatization". It is the Internet connecting objects. Using local network or Internet and other communication technologies to connect sensors, controllers, machines, people and things together in a new way to form a connection between people and things, things and things, so as to achieve an informational, remote management controlled and intelligent Internet.

In traditional IoT solutions, there is usually a control center (such as a gateway, an intelligent speaker, etc.) in the home, and the control center is connected to various appliances in the home. The user uses a mobile phone to remotely interact with applications on the home control center to control the appliances in the home. However, current IoT solutions are not intelligent and open enough.

SUMMARY

Embodiments of the present disclosure seek to solve at least one of the problems existing in the related art to at least some extent.

Embodiments of the present disclosure provide an implementation system for Internet of Things based on artificial intelligence.

Embodiments of the present disclosure provide an implementation method for Internet of Things based on artificial intelligence.

In order to achieve the above objectives, the implementation system for Internet of Things based on artificial intelligence according to a first aspect of the present disclosure includes: a cloud central control system, a home intelligent central control system, and a home intelligent terminal; the home intelligent central control system providing information or services to a user via a local module or through a cooperation with the cloud central control system; the home intelligent terminal being configured to make a response to a control instruction sent by the home intelligent central control system, and/or to send state information of the home intelligent terminal to the home intelligent central control system; in which the cloud central control system and/or the home intelligent central control system is configured with an intelligent module.

In order to achieve the above object, the implementation method for Internet of Things based on artificial intelligence according to a second aspect of the present disclosure includes: providing, by a home intelligent central control system, information or services to a user via a local module or through a cooperation with a cloud central control system; and sending, by the home intelligent central control system, a control instruction to a home intelligent terminal to cause the home intelligent terminal to make a response to the control instruction when the user needs to control the home intelligent terminal.

Embodiments of the present disclosure may also provide a non-transitory computer readable storage medium, in which when instructions in the storage medium is executed by a processor of a home intelligent central control system, the home intelligent central control system is caused to perform a method, the method may include: providing information or services to a user via a local module or through a cooperation with a cloud central control system; and sending a control instruction to a home intelligent terminal to cause the home intelligent terminal to make a response to the control instruction when the user needs to control the home intelligent terminal.

Additional aspects and advantages of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
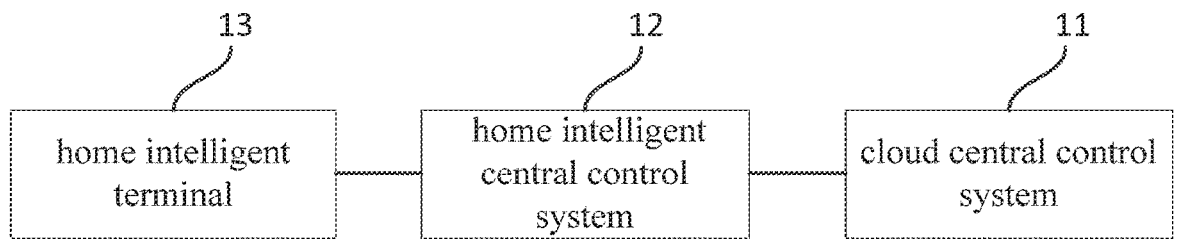
FIG. 1 is a schematic structural diagram of an implementation system for Internet of Things based on artificial intelligence according to an embodiment of the present disclosure.

Reference will be made in detail to embodiments of the present disclosure, where the same or similar elements and the elements having same or similar functions are denoted by like reference numerals throughout the descriptions. The embodiments described below with reference to the drawings are intended to illustrate the present disclosure and are not to be construed to limit the present disclosure. Instead, embodiments of the present disclosure include all modifications, variations and equivalents within the spirit and scope of the appended claims.

FIG. 1 is a schematic structural diagram of an implementation system for Internet of Things based on artificial intelligence according to an embodiment of the present disclosure.

Referring to FIG. 1, the system of this embodiment includes: a cloud central control system 11, a home intelligent central control system 12 and a home intelligent terminal 13.

The cloud central control system 11 is configured at cloud, the home intelligent central control system 12 and the home intelligent terminal 13 are configured inside a user's home.

The cloud central control system and/or the home intelligent central control system may be configured with an intelligent module, such that the intelligence of the IoT may be improved.

The home intelligent central control system 12 provides information or services to a user via a local module.

Alternatively, the home intelligent central control system 12 may provide information or services to the user through a cooperation with the cloud central control system 11.

The home intelligent terminal 13 is configured to make a response to a control instruction sent by the home intelligent central control system 12, and/or to send state information of the home intelligent terminal to the home intelligent central control system 12.

In some embodiments, when the home intelligent central control system and the cloud central control system are combined to provide information or services to the user, the advantages of large amount of data and strong processing capability of the cloud may be fully utilized. In addition, the intelligent strategy is configured at cloud, which is easy to upgrade and avoid impact on users.

Figure 2:
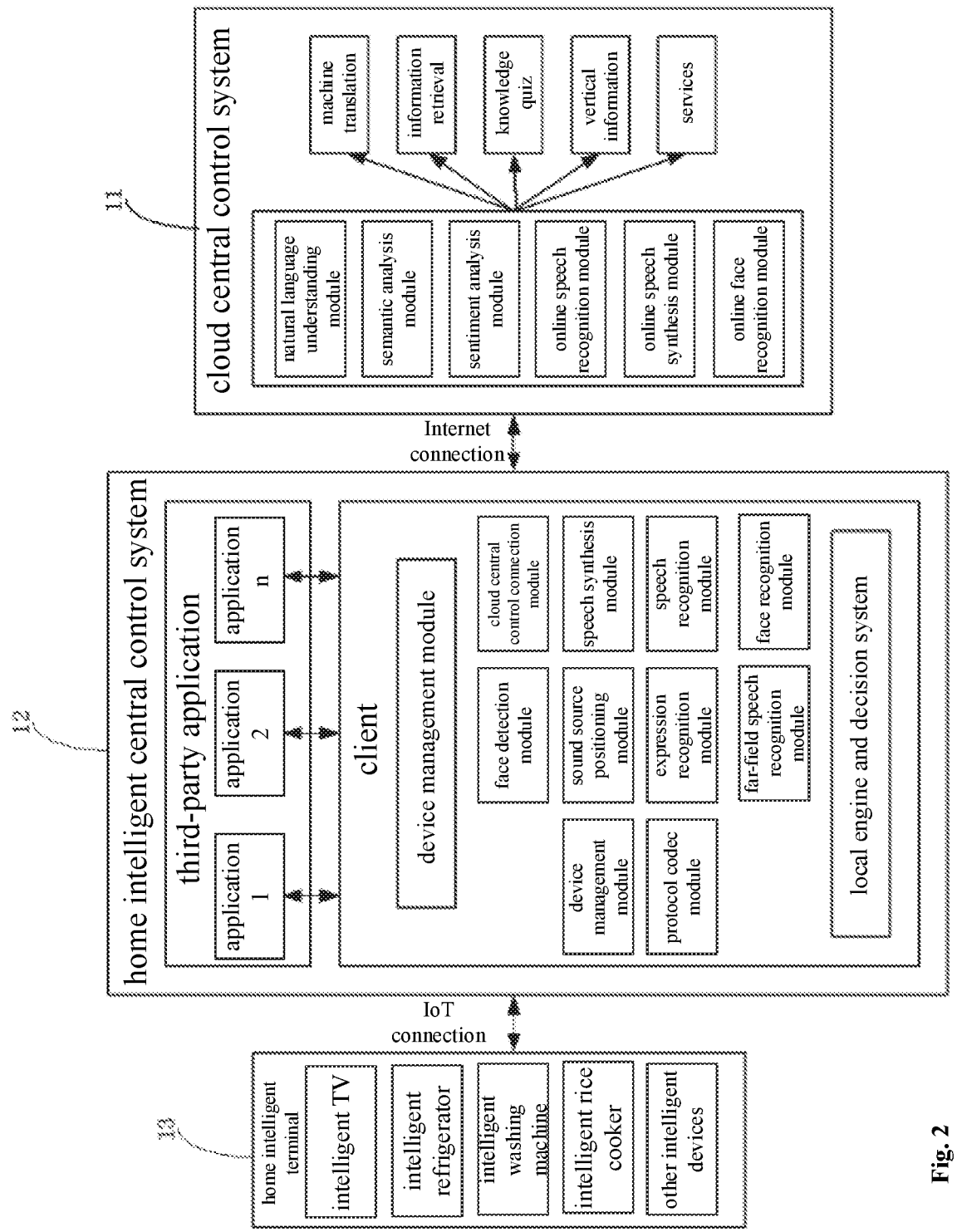
FIG. 2 is a schematic structural diagram of an implementation system for Internet of Things based on artificial intelligence according to another embodiment of the present disclosure.

Specifically, referring to FIG. 2, the cloud central control system may include one or more of: a natural language understanding module, a semantic analysis module, a sentiment analysis module, an online speech recognition module, an online speech synthesis module, and an online face recognition module.

By providing the above modules, the cloud central control system may enhance the intelligence. For example, by the natural language understanding, the semantic analysis, the sentiment analysis, etc., the user's demands may be understood more intelligently. By the online speech recognition, the speech inputted by the user may be recognized, such that the user may input using speech or voice, which is not limited to the manner of operating a mobile phone operation interface in the IoT. By the online face recognition, the user's identity may be identified automatically, and there is no need to manually enter an account password to authenticate the identity. By the online voice synthesis, the information or service required by the user may be played in a manner of voice, and feedback information may still be received when the user is inconvenient to perform two-hand operation.

Therefore, by setting the above modules in the cloud central control system, it is possible to provide the user with intelligent information and services, including, for example, machine translation, information retrieval, knowledge quiz, and vertical information (such as weather, food, medical care, pets, transportation, etc.), services (such as shopping, booking, etc.).

In some embodiments, when the home intelligent central control system provides information or services to the user locally, it may have richer perceptual capabilities, being able to make immediate decisions, making a response quickly, and also making decisions in motion.

Referring to FIG. 2, the home intelligent central control system may include: a client configured by default, and/or a third-party application; in which the client may include an open interface, and the third-party application is configured to be able to invoke a module in the client via the open interface.

By setting the open interface in the client, the openness may be improved, and the user needs may be satisfied.

In addition, the client and the third-party application are independent from each other, such that they may be upgraded independently to avoid mutual influence.

Specifically, referring to FIG. 2, the client includes one or more of: a local engine and decision system, a far-field speech recognition module, a cloud central control connection module, a face detection module, a sound source positioning module, an expression recognition module, a face recognition module, a speech recognition module, a speech synthesis module, an application management module, a device management module, and a protocol codec module.

When the user interacts with the home intelligent central control system, the user may input information in a natural language. Accordingly, after the home intelligent central control system obtains the feedback information locally or from the cloud, the user may play the feedback information e the natural language.

When the far-field speech recognition module is included in the client, the user may input far-field speech. After receiving and recognizing the far-field speech inputted by the user, the client may make a response to the far-field speech inputted by the user through the local engine and decision system. Alternatively, the client may also send the identified far-field speech to the cloud central control system, and the cloud central control system may make a response to the far-field speech inputted by the user, and feeds feedback information or services to the user via the client in text or voice. Alternatively, the client may also send the far-field speech information inputted by the user to the cloud central control system in an online manner, and the cloud central control system performs the online speech recognition, and makes a response to the recognition result, and feeds back the feedback information or services to the user via the client in text or voice.

When the home intelligent central control system and the cloud central control system need to be combined, the cloud central control connection module in the client may communicate with the cloud central control system.

The home intelligent central control system provides information or services to a user via a local module or through a cooperation with a cloud central control system, for example, including: chatting with the user, performing a knowledge quiz with the user, and feeding back a road condition of the user's query, and may also include online to offline (020) services such as satisfying the user's purchasing and placing an order.

In addition, a module for identifying user-related information, such as identity information, location information, expression information, and the like, may also be included in the home intelligent central control system. Specifically, the module for identifying user-related information includes, for example, the face detection module, the sound source positioning module, the expression recognition module, and the face recognition module mentioned above. Through the above modules, the user may be better understood, such that a rich and intelligent interactive response may be provided.

In the connection mode, an Internet communication protocol may be adopted between the home intelligent central control system and the cloud central control system. An IoT communication protocol is adopted between the home intelligent central control system and the home intelligent terminal. For example, the IoT protocol may include WiFi, BLE, Zigbee, Bluetooth, or ZWare etc.

Therefore, a protocol codec module may also be set in the home intelligent central control system to ensure a normal communication between the home intelligent central control system and the cloud central control system and the home intelligent terminal.

In addition, the home intelligent central control system of the embodiment may also be an open platform. The home intelligent central control system may include not only a client configured by default, but also a third-party application, for example, an application provided by a certain home intelligent terminal manufacturer. The third-party application may be able to invoke the device management module through the open interface provided by the client to provide a richer response strategy according to its own scenarios and requirements.

The home intelligent central control system may manage the third-party application through the application management module.

Referring to FIG. 2, the home intelligent terminal includes, for example, an intelligent TV, an intelligent refrigerator, an intelligent washing machine, an intelligent rice cooker and other intelligent devices.

The home intelligent terminal may make a response to the control command issued by the home intelligent central control system. For example, the user may input "turn on the television" in a far-field natural language in the home intelligent central control system, after which the home intelligent central control system may recognize the speech and send a power-on command to the intelligent TV according to the recognition result. After the intelligent TV receives the power-on command, and the intelligent TV is turned on.

In addition, the home intelligent terminal may also feed its own state information back to the home intelligent central control system, such that the home intelligent central control system performs related processing according to the state information of the home intelligent terminal. For example, the intelligent TV feeds back to the home intelligent terminal that it is currently in the power-on state, and when the home intelligent terminal acquires that the user does not watch it, the intelligent TV may be directly instructed to shut down or remind the user whether to shut down.

It may be understood that an intelligent communication chip conforming to the IoT communication protocol needs to be built in the home intelligent terminal to interact with the home intelligent central control system.

In this embodiment, a more intelligent IoT solution may be provided for the user by using the local home intelligent control system, or by combining the home intelligent central control system and the cloud central control system. Further, after the open interface is set in the home intelligent central control system, the openness of the IoT solution may be improved.

Specifically, intelligent interaction capabilities, such as a far-field speech recognition, a natural language understanding, an intelligent dialogue, a machine translation, a sentiment analysis, a face detection and recognition, etc., may be achieved by using powerful cloud service capabilities and a flexible local engine, such that rich intelligent interaction capabilities may be provided. By providing the open interface at the client, the third-party application may be able to invoke modules in the client to obtain rich intelligent interaction capabilities. At the same time, the third-party application may also implement its own application logic, and invoke the device management module in the client to control the home intelligent terminal and acquires the feedback information of the state of the device, so as to provide an open platform. By configuring the intelligent module in the cloud, advantages of the large amount of data and the strong processing power of the client may be fully considered, and the upgrade and expansion capabilities may be provided as needed. In addition, the client may be upgraded independently from the user's application, which may avoid bringing troubles to the user, such that the flexible upgrade and scalability may be obtained.

Figure 3:
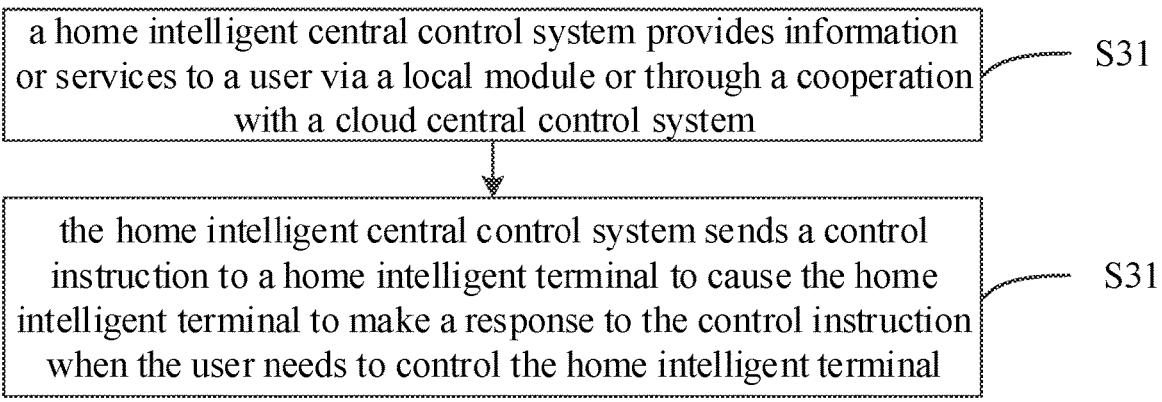
FIG. 3 is a schematic flow chart of an implementation method for Internet of Things based on artificial intelligence according to an embodiment of the present disclosure.

FIG. 3 is a schematic flow chart of an implementation method for Internet of Things based on artificial intelligence according to an embodiment of the present disclosure.

Referring to FIG. 3, the method of this embodiment may include followings.

At block S31, a home intelligent central control system provides information or services to a user via a local module or through a cooperation with a cloud central control system.

At block S32, the home intelligent central control system sends a control instruction to a home intelligent terminal to cause the home intelligent terminal to make a response to the control instruction when the user needs to control the home intelligent terminal.

Figure 4:
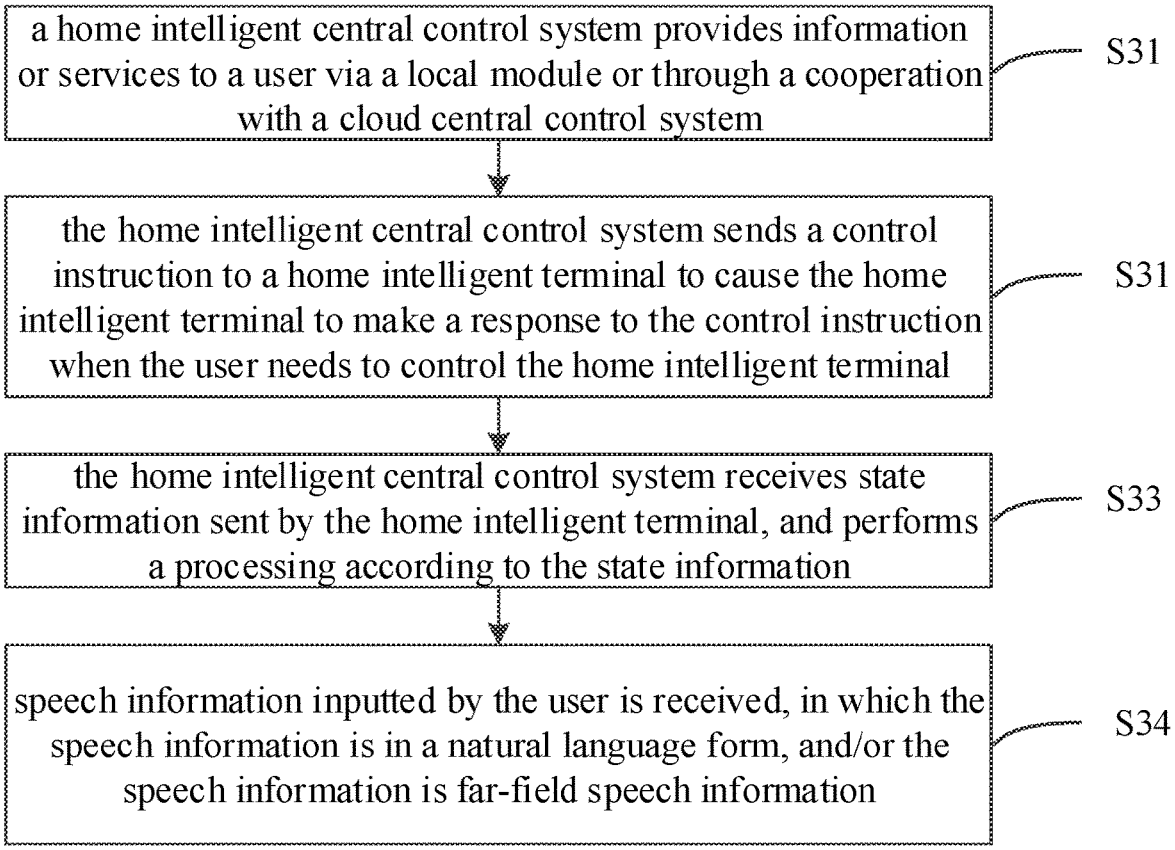
FIG. 4 is a schematic flow chart of an implementation system for Internet of Things based on artificial intelligence according to another embodiment of the present disclosure.

In some embodiments, referring to FIG. 4, the method of this embodiment may also include followings.

At block S33, the home intelligent central control system receives state information sent by the home intelligent terminal, and performs a processing according to the state information.

In some embodiments, the home intelligent central control system may include: a client configured by default, and/or a third-party application; in which the client may include an open interface, and the third-party application is configured to be able to invoke a module in the client via the open interface.

In some embodiments, referring to FIG. 4, the method of this embodiment may also include followings.

At block S34, speech information inputted by the user is received, in which the speech information is in a natural language form, and/or the speech information is far-field speech information.

It can be understood that the method of this embodiment corresponds to the foregoing system. Specifically, the components of the home intelligent terminal, the home intelligent central control system, and the cloud central control system, and the interaction process between the foregoing three parts, and the internal processing procedure of each of the foregoing three parts, refer to the related description in the above system embodiment, which will not be described in detail herein.

In this embodiment, a more intelligent IoT solution may be provided for the user by using the local home intelligent control system, or by combining the home intelligent central control system and the cloud central control system. Further, after the open interface is set in the home intelligent central control system, the openness of the IoT solution may be improved.

Embodiments of the present disclosure also provide a home intelligent central control system, including: a processor; a memory for storing processor executable instructions;

wherein the processor is configured to: provide information or services to a user via a local module or through a cooperation with a cloud central control system; and send a control instruction to a home intelligent terminal to cause the home intelligent terminal to make a response to the control instruction when the user needs to control the home intelligent terminal.

Embodiments of the present disclosure also provide a non-transitory computer readable storage medium, in which when instructions in the storage medium is executed by a processor of a home intelligent central control system, the home intelligent central control system is caused to perform a method, the method includes: providing information or services to a user via a local module or through a cooperation with a cloud central control system; and sending a control instruction to a home intelligent terminal to cause the home intelligent terminal to make a response to the control instruction when the user needs to control the home intelligent terminal.

Embodiments of the present disclosure also provide a computer program product, in which when instructions in the computer program product is executed by a processor, a method is performed, the method includes: providing information or services to a user via a local module or through a cooperation with a cloud central control system; and sending a control instruction to a home intelligent terminal to cause the home intelligent terminal to make a response to the control instruction when the user needs to control the home intelligent terminal.

It should be noted that terms such as "first" and "second" described in the present disclosure are used for purposes of description and are not intended to indicate or imply relative importance or significance. In addition, "a plurality of" means two or more than two, such as two or three, unless specified otherwise.

The flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc.

Reference throughout this specification to "one embodiment", "some embodiments," "an example", "a specific example," or "some examples," means that a particular feature, structure, material, or characteristic described in connection with the embodiment or example is included in at least one embodiment or example of the present disclosure. In this specification, exemplary descriptions of the above terms are not necessarily referring to the same embodiment or example. Furthermore, the particular features, structures, materials, or characteristics may be combined in any suitable manner in one or more embodiments or examples.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. An implementation system for Internet of Things based on artificial intelligence, comprising:

a cloud central control system, a home intelligent central control system, and a home intelligent terminal;

the home intelligent central control system providing information or services to a user in at least one manner of: via a local module and through a cooperation with the cloud central control system;

the home intelligent terminal being configured to perform at least one of following acts: making a response to a control instruction sent by the home intelligent central control system, and sending state information of the home intelligent terminal to the home intelligent central control system;

wherein at least one of the cloud central control system and the home intelligent central control system is configured with an intelligent module;

wherein the home intelligent central control system comprises a client configured by default and a third-party application;

wherein the client comprises an open interface and at least one of: a local engine and decision system, a far-field speech recognition module, a cloud central control connection module, a face detection module, a sound source positioning module, an expression recognition module, a face recognition module, a speech recognition module, a speech synthesis module, an application management module, a device management module, and a protocol codec module;

wherein the third-party application is configured to be able to invoke the at least one module in the client via the open interface;

wherein the client and the third-party application are independent from each other, and the client is upgraded independently from the third-party application;

wherein in response to a invoking instruction of the third-party application, the speech recognition module or the far-field speech recognition module in the client is configured to receive speech information inputted by the user, the client obtains feedback information or services through the local engine and decision system in the client or from the cloud central control system, the third-party application determines the control instruction according to the feedback information or services, and sends the control instruction to the home intelligent terminal;

wherein the speech information satisfies at least one of: being in a natural language form, and being far-field speech information.

2. The system according to claim 1, wherein the cloud central control system comprises at least one of:

a natural language understanding module, a semantic analysis module, a sentiment analysis module, an online speech recognition module, an online speech synthesis module, and an online face recognition module.

3. The system according to claim 1, wherein, when the home intelligent central control system receives input information in a natural language, the home intelligent central control system obtains feedback information locally or from the cloud, and play the feedback information in the natural language.

4. The system according to claim 1, wherein, when the far-field speech recognition module in the client receives and recognizes the far-field speech inputted by the user, the client makes a response to the far-field speech inputted by the user through the local engine and decision system; or, the client send the identified far-field speech to the cloud central control system, and the cloud central control system makes a response to the far-field speech inputted by the user, and feeds feedback information or services to the user via the client in text or voice; or, the client sends the far-field speech information inputted by the user to the cloud central control system in an online manner, and the cloud central control system performs the online speech recognition, and makes a response to the recognition result, and feeds back the feedback information or services to the user via the client in text or voice.

5. An implementation method for Internet of Things based on artificial intelligence, comprising:

providing, by a home intelligent central control system, information or services to a user in at least one manner of: via a local module and through a cooperation with a cloud central control system; and sending, by the home intelligent central control system, a control instruction to a home intelligent terminal to cause the home intelligent terminal to make a response to the control instruction when the user needs to control the home intelligent terminal;

wherein, the home intelligent central control system comprises a client configured by default, and a third-party applications, the client comprises an open interface, the third-party application is configured to be able to invoke a module in the client via the open interface;

the client and the third-party application being independent from each other, and upgrading the client independently from the third-party application;

wherein the client comprises at least one of: a local engine and decision system, a far-field speech recognition module, a cloud central control connection module, a face detection module, a sound source positioning module, an expression recognition module, a face recognition module, a speech recognition module, a speech synthesis module, an application management module, a device management module, and a protocol codec module;

wherein the method further comprising:

in response to a invoking instruction of the third-party application, receiving, by the speech recognition module or the far-field speech recognition module in the client, speech information inputted by the user;

obtaining, by the client, feedback information or services through the local engine and decision system in the client or from the cloud central control system;

determining, by the third-party application, the control instruction according to the feedback information or services, and sending the control instruction to the home intelligent terminal;

the speech information satisfying at least one of: being in a natural language form, and being far-field speech information.

6. The method according to claim 5, further comprising: receiving, by the home intelligent central control system, state information sent by the home intelligent terminal, and performing a processing according to the state information.

7. The method according to claim 5, further comprising: when receiving, by the home intelligent central control system, input information in a natural language, obtaining, by the home intelligent central control system, the feedback information locally or from the cloud, and playing the feedback information in the natural language.

8. The method according to claim 5, further comprising: when receiving and recognizing, by the far-field speech recognition module, the far-field speech inputted by the user, making, by the client, a response to the far-field speech inputted by the user through the local engine and decision system; or, sending, by the client, the identified far-field speech to the cloud central control system, and making, by the cloud central control system, a response to the far-field speech inputted by the user, and feeding feedback information or services to the user via the client in text or voice; or, sending, by the client, the far-field speech information inputted by the user to the cloud central control system in an online manner, and performing, by the cloud central control system, the online speech recognition, and making a response to the recognition result, and feeding back the feedback information or services to the user via the client in text or voice.

9. A non-transitory computer readable storage medium, wherein when instructions in the storage medium is executed by a processor of a home intelligent central control system, the home intelligent central control system is caused to perform a method, the method comprises:

providing information or services to a user in at least one manner of: via a local module and through a cooperation with a cloud central control system; and sending a control instruction to a home intelligent terminal to cause the home intelligent terminal to make a response to the control instruction when the user needs to control the home intelligent terminal;

wherein, the home intelligent central control system comprises: a client configured by default, and a third-party applications, the client comprises an open interface, the third-party application is configured to be able to invoke a module in the client via the open interface;

the client and the third-party application being independent from each other, and upgrading the client independently from the third-party application;

wherein the client comprises at least one of: a local engine and decision system, a far-field speech recognition module, a cloud central control connection module, a face detection module, a sound source positioning module, an expression recognition module, a face recognition module, a speech recognition module, a speech synthesis module, an application management module, a device management module, and a protocol codec module;

wherein the method further comprising:

in response to a invoking instruction of the third-party application, receiving, by the speech recognition module or the far-field speech recognition module in the client, speech information inputted by the user;

obtaining, by the client, feedback information or services through the local engine and decision system in the client or from the cloud central control system;

determining, by the third-party application, the control instruction according to the feedback information or services, and sending the control instruction to the home intelligent terminal;

the speech information satisfying at least one of: being in a natural language form, and being far-field speech information.

\* \* \* \* \*